United States Patent
Hill et al.

(10) Patent No.: US 11,128,663 B2
(45) Date of Patent: Sep. 21, 2021

(54) SYNCHRONIZING LINK AND EVENT DETECTION MECHANISMS WITH A SECURE SESSION ASSOCIATED WITH THE LINK

(71) Applicant: Cisco Technology, Inc., San Jose, CA (US)

(72) Inventors: Craig Thomas Hill, Sterling, VA (US); Stephen Michael Orr, Wallkill, NY (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 107 days.

(21) Appl. No.: 16/161,716

(22) Filed: Oct. 16, 2018

(65) Prior Publication Data
US 2020/0120134 A1  Apr. 16, 2020

(51) Int. Cl.
*H04L 29/06* (2006.01)
*H04L 29/08* (2006.01)

(52) U.S. Cl.
CPC ........ *H04L 63/162* (2013.01); *H04L 63/0485* (2013.01); *H04L 63/061* (2013.01); *H04L 63/164* (2013.01); *H04L 67/145* (2013.01)

(58) Field of Classification Search
CPC ... H04L 63/162; H04L 63/061; H04L 63/165; H04L 63/0485; H04L 67/14; H04L 67/145; H04L 67/143
See application file for complete search history.

(56) References Cited

U.S. PATENT DOCUMENTS

| | | | |
|---|---|---|---|
| 8,520,595 B2 | 8/2013 | Yadav et al. | |
| 2006/0062206 A1* | 3/2006 | Krishnaswamy | ... H04L 12/2859 370/352 |
| 2006/0095962 A1* | 5/2006 | Lioy | ........................ H04L 63/08 726/21 |
| 2007/0180104 A1* | 8/2007 | Filsfils | .................... H04L 45/02 709/224 |
| 2008/0126559 A1 | 5/2008 | Elzur et al. | |

(Continued)

OTHER PUBLICATIONS

D. Katz et al., "Bidirectional Forwarding Detection (BFD)", Internet Engineering Task Force (IETF), Request for Comments: 5880, Category: Standards Track, ISSN: 2070-1721, Jun. 2010, 49 pages.

*Primary Examiner* — Kristine L Kincaid
*Assistant Examiner* — Shaqueal D Wade
(74) *Attorney, Agent, or Firm* — Edell, Shapiro & Finnan, LLC

(57) ABSTRACT

A first network element, such as a router, in a computer network may have established a communication link with a second network element in the computer network. A secure session associated with the communication link between the first and second network elements may then be established. The secure session may use a secure communication function on each of the first network element and the second network element. The first network element may then detect that the first network element cannot communicate with the second network element over the communication link. When the first network element cannot communicate with the second network element, the first network element may terminate the communication link and the secure session associated with the communication link.

20 Claims, 6 Drawing Sheets

(56) References Cited

U.S. PATENT DOCUMENTS

| | | |
|---|---|---|
| 2009/0037601 A1* | 2/2009 | Jain .................. H04L 12/66 |
| | | 709/242 |
| 2009/0307751 A1 | 12/2009 | Lin et al. |
| 2009/0323520 A1* | 12/2009 | Kapoor .............. H04L 69/14 |
| | | 370/225 |
| 2011/0019539 A1* | 1/2011 | Suzuki .............. H04L 49/552 |
| | | 370/225 |
| 2011/0087878 A1 | 4/2011 | Weis et al. |
| 2012/0271380 A1* | 10/2012 | Roberts .............. H04L 9/088 |
| | | 607/60 |
| 2015/0081348 A1* | 3/2015 | Avera ................ G06Q 10/02 |
| | | 705/5 |
| 2015/0365409 A1 | 12/2015 | Mohamed et al. |
| 2016/0036813 A1* | 2/2016 | Wakumoto .......... H04L 63/0272 |
| | | 713/171 |
| 2016/0043996 A1 | 2/2016 | Syed Mohamed et al. |
| 2016/0308748 A1* | 10/2016 | Zuo .................. H04W 76/25 |
| 2019/0116183 A1* | 4/2019 | Hussain .............. H04L 63/08 |

\* cited by examiner

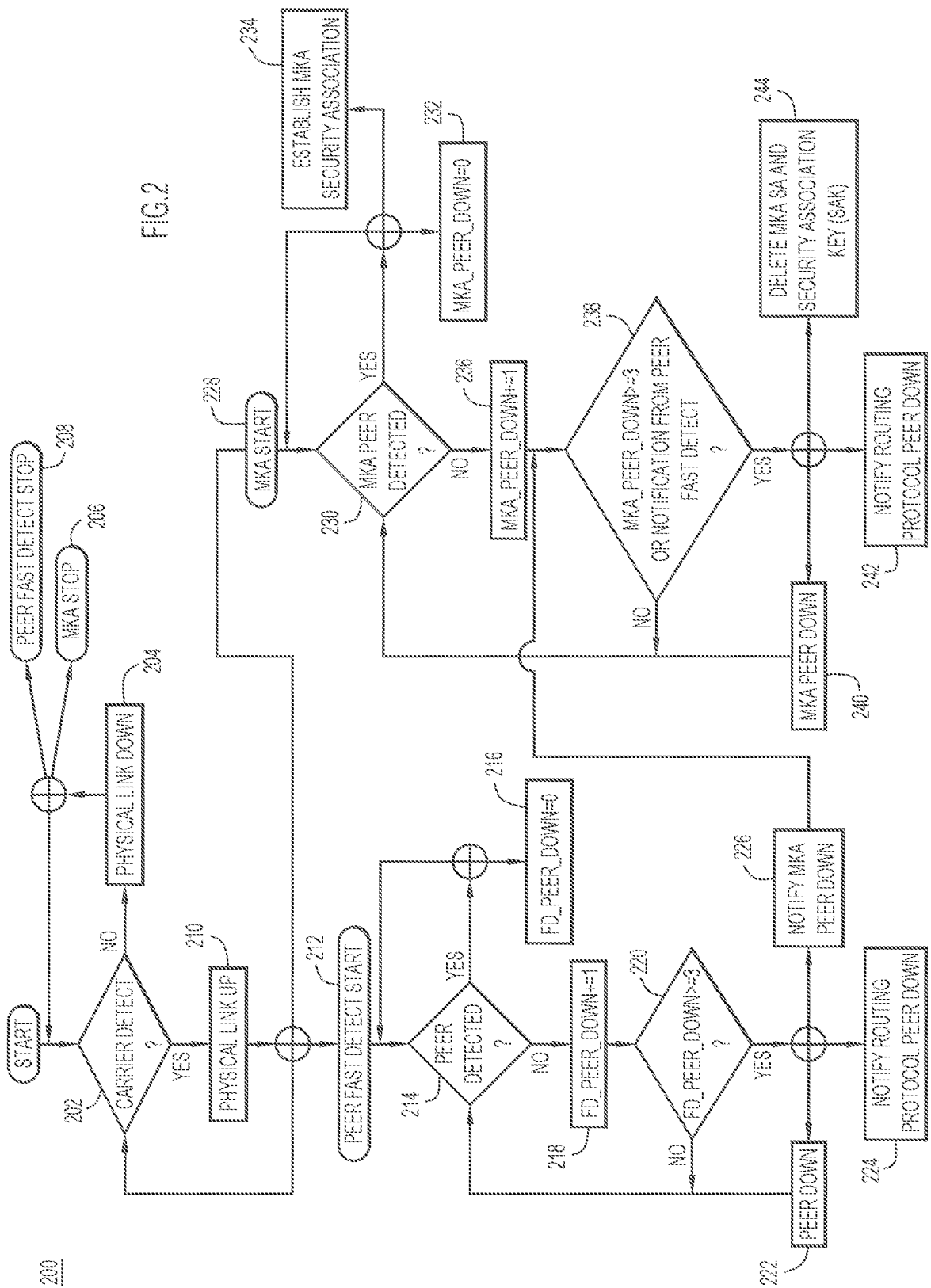

SYNCHRONIZING LINK AND EVENT DETECTION MECHANISMS WITH A SECURE SESSION ASSOCIATED WITH THE LINK

TECHNICAL FIELD

The present disclosure relates to communication link routing and security.

BACKGROUND

In computer networks, communication links between network elements may become inoperable because, for example, one of the network elements may become unavailable. To mitigate the impact of a communication link becoming inoperable, the network elements within the computer network may use sub-second convergence techniques for re-routing. The convergence techniques may determine a new communication link to use in place of the inoperable communication link. However, when the inoperable link had an associated secure session, the secure communication functions employed by the secure session may not detect that the communication link has become inoperable for a relatively long period of time. This may result in routing brownouts or blackouts that are difficult for network administrators to detect.

BRIEF DESCRIPTION OF THE DRAWINGS

FIG. 2 is a flowchart depicting a method for synchronizing communication links with their associated secure sessions, according to an example embodiment.

DESCRIPTION OF EXAMPLE EMBODIMENTS

Overview

Briefly, a first network element, such as a router in a computer network, may have established a communication link with a second network element in the computer network. A secure session associated with the communication link between the first and second network elements may then be established. The secure session may use a secure communication function on each of the first network element and the second network element. The first network element may then detect that the first network element cannot communicate with the second network element over the communication link. When the first network element cannot communicate with the second network element, the first network element may terminate the communication link and the secure session associated with the communication link.

Example Embodiments

Figure 1A:
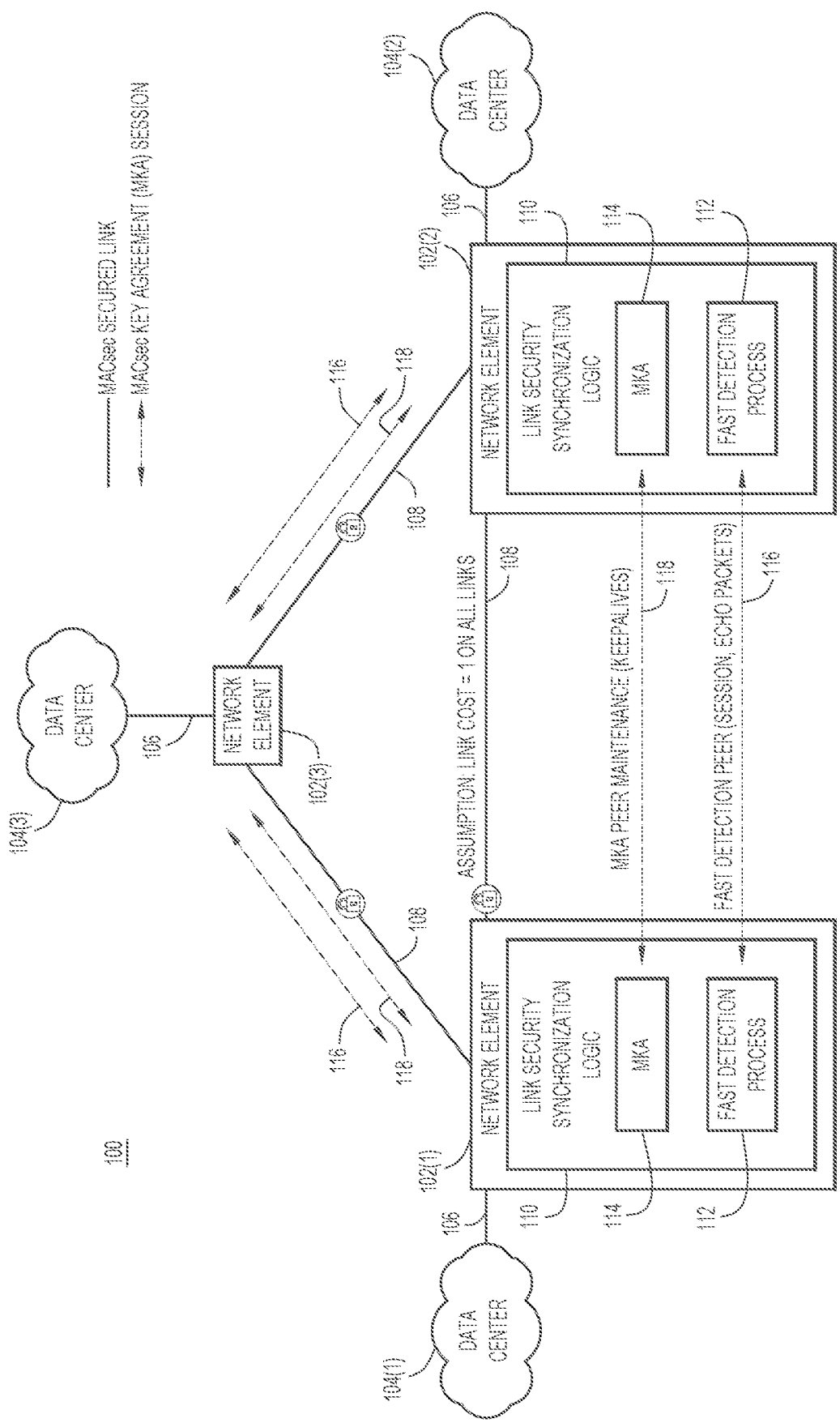
FIGS. 1A-1C are block diagrams of a computer network configured to use techniques to synchronize a communication link with a secure session associated with the communication link, according to an example embodiment.
Figure 1B:
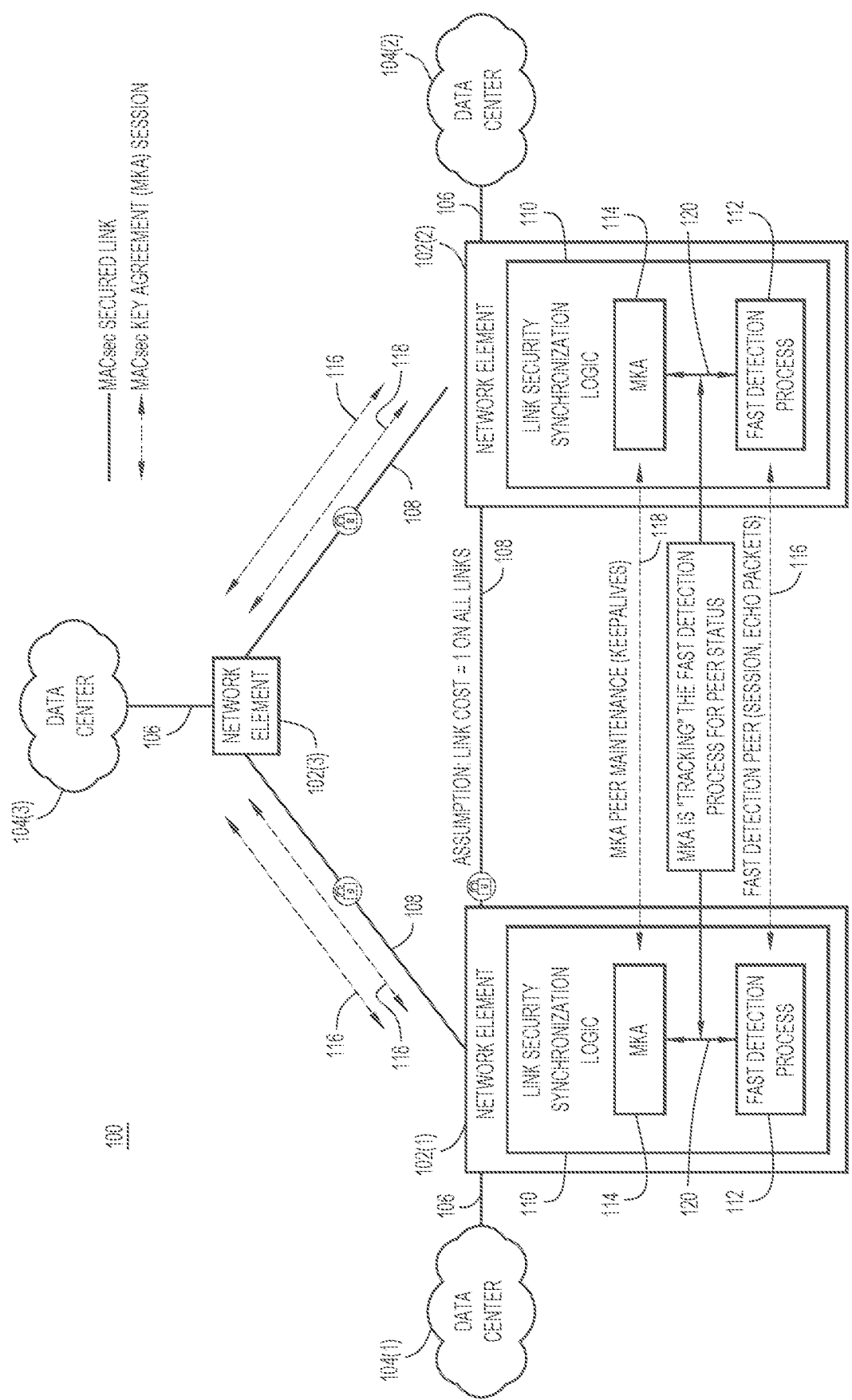
Figure 1C:
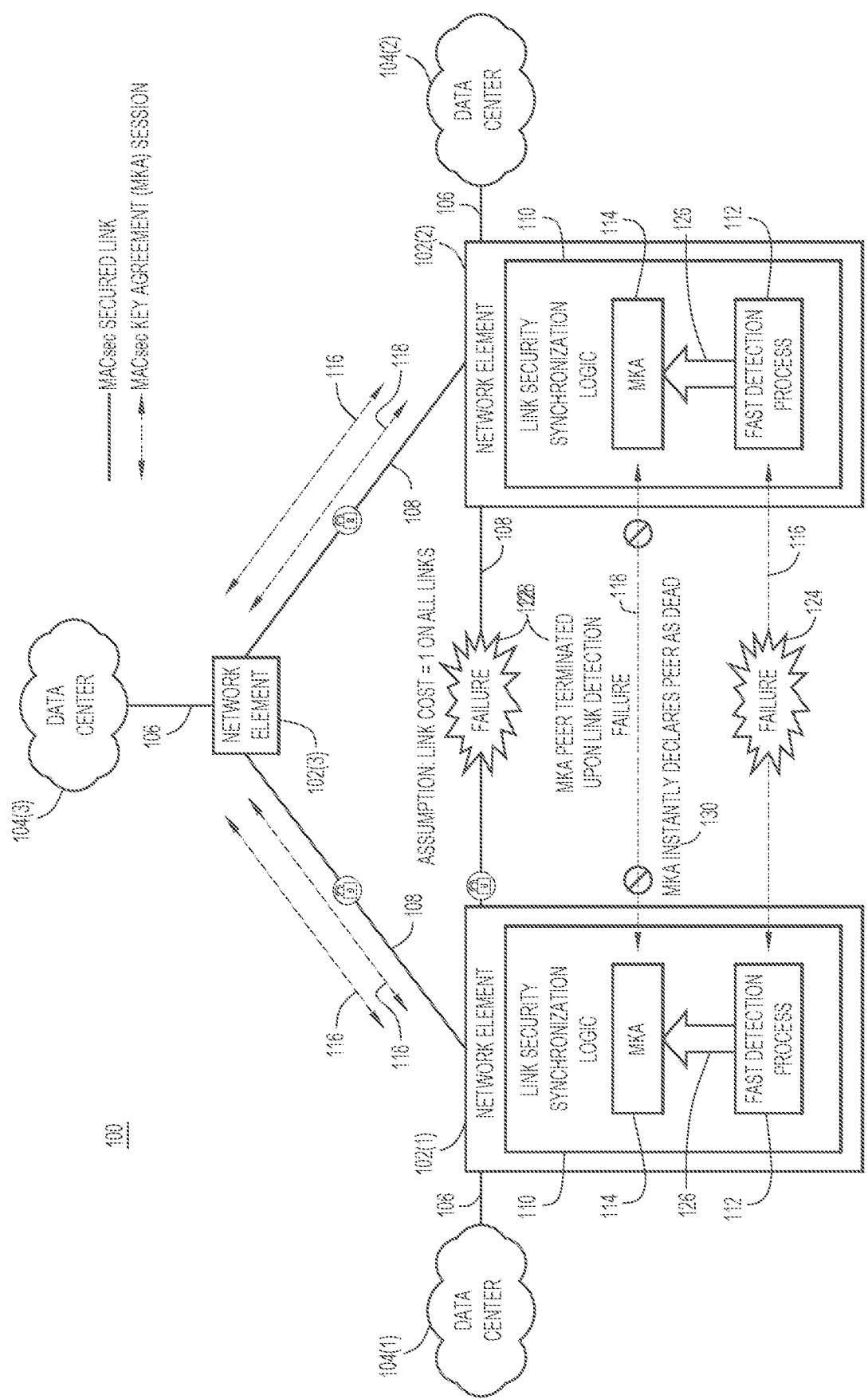

Reference is made to FIGS. 1A-1C which show a computer network 100 configured to use techniques to synchronize a communication link with a secure session associated with the communication link, according to an example embodiment. Specifically, in FIG. 1A, the computer network 100 includes three network elements 102(1), 102(2), 102(3). It should be appreciated that any number of network elements may be included in the computer network 100. Moreover, the network elements may be any of a variety of types of network devices, such as a router, a switch, a proxy, a gateway, etc. The network elements 102(1), 102(2), 102(3) may be connected to data centers 104(1), 104(2), 104(3), respectively, via communication links 106. Moreover, the network elements 102(1), 102(2), 102(3) may be connected with each other via secured communication links 108. The secured communication links 108 may be communication links with an associated secure session. The associated secure session may use a secure communication function to secure the session. For example, the secure communication links 108 may be secured using the Media Access Control Security (MACsec) protocol as the secure communication function. It should be appreciated that other protocols, such as the Internet Protocol security (IPsec) protocol may also be used as the secure communication function. For example purposes only, it is assumed that the secure communication links 108 are secured using MACsec. It should also be appreciated that the communication links 106 and the secure communication links 108 may be wired links, wireless links, or a combination of wired and wireless links.

Each of the network elements 102(1), 102(2), 102(3) may include link security synchronization logic 110. For example purposes only, only the link security synchronization logic 110 of the first network element 102(1) and the second network element 102(2) will be described. The link security synchronization logic 110 may include a fast detection process 112, which will be described in more detail herein. When MACsec is used to secure the secure communication link 108, the link security synchronization logic 110 may also include a MACsec Key Agreement (MKA) process 114 which may perform the MKA protocol, also as described in more detail herein. When MACsec is used, the MKA process 114 may be the secure communication function on each of the first network element 102(1) and the second network element 102(2). In another embodiment, IPsec and/or Transport Layer Security (TLS) may be used. In this embodiment, IPsec and/or TLS may perform an Internet Key Exchange (IKE) process which may perform the IKE protocol instead of an MKA process performing the MKA protocol. It should be appreciated that similar techniques may be performed for other key agreement technologies.

When the secure communication link 108 between the first network element 102(1) and the second network element 102(2) is established, the fast detection process 112 may periodically send one or more status messages 116 from the first network element 102(1) to the second network element 102(2) and vice versa. The status messages 116 may be in the form of session packets, echo packets, keepalive packets, etc. The fast detection process 112 may use various protocols, such as bidirectional forwarding detection (BFD), to send the status messages 116. The status messages 116 may be used by the fast detection process 112 of network element 102(1) to determine whether network element 102(2) is available or reachable, for example. The fast detection process 112 may send status messages 116 at sub-second intervals, such as every 15 milliseconds (ms).

When the secure communication link 108 has been secured using MACsec, the MKA process 114 may enable and perform the MKA protocol. The MKA protocol is responsible for maintaining MACsec on the secure communication link 108. To this end, the MKA process 114 may periodically send MKA status messages 118 from the first network element 102(1) to the second network element 102(2) and vice versa. The MKA status messages 118 may be in the form of keepalive packets, for example. The MKA process 114 may send MKA status messages 118 at a longer time period as compared to status messages 116 sent by the fast detection process 112. For example, the MKA status messages may be sent every two seconds.

Turning to FIG. 1B, shown is the computer network 100 where the fast detection process 112 and the MKA process 114 are synchronized, according to an example embodiment. Conventionally, key agreement processes are not synchronized with fast detection processes. For example, the MKA process 114 is not synchronized with the fast detection process 112. Therefore, the fast detection process 112 and the MKA process 114 may detect that the first network element 102(1) cannot communicate with the second network element 102(2) over the secure communication link 108 at different times. As discussed above, the fast detection process 112 may send status messages 116 every 15 ms. When a number of unresponded to status messages exceeds a predetermined threshold, the fast detection process 112 may determine that the first network element 102(1) cannot communicate with the second network element 102(2) over the secure communication link 108. For example, the predetermined threshold may be three. Therefore, the fast detection process 112 may determine that the first network element 102(1) cannot communicate with the second network element in 45 ms, thereby enabling sub-second convergence.

In contrast, the MKA process 114 may send MKA status messages 118 every two seconds. When a number of unresponded to MKA status messages exceeds a predetermined threshold, the MKA process 114 may determine that the first network element 102(1) cannot communicate with the second network element 102(2) over the secure communication link 108. For example, the predetermined threshold may be three. Therefore, the MKA process 114 may determine that the first network element 102(1) cannot communicate with the second network element 102(2) in six seconds. Therefore, unlike the fast detection process 112, the MKA process 114 does not enable sub-second convergence. Accordingly, the MKA process 114 may be significantly slower than the fast detection process 112 in detecting that the first network element 102(1) cannot communicate with the second network element 102(2). Because the fast detection process 112 is not synchronized with the MKA process 114, unstable anomalies in a network element may result. For example, unstable anomalies may include outdated or stale MKA key information, MKA sessions may still exist while an associated forwarding path does not, black hole routing, and unsynchronized routing paths and secured paths.

Turning to FIG. 1C, shown is the computer network 100 when the first network element 102(1) cannot communicate with the second network element 102(2), according to an example embodiment. In FIG. 1C, there is a failure at 122 in the secure communication link 108 between the first network element 102(1) and the second network element 102(2). The failure at 122 may occur because the second network element 102(2) may become unavailable, for example.

The fast detection process 112 at the first network element 102(1) and the second network element 102(2) may continue to send status messages 116 to each other. However, because of the failure at 122 in the secure communication link 108, the fast detection process 112 on the first network element and the second network element 102(2) will not receive a response to the status messages 116. Once the number of unresponded to status messages exceeds a predetermined threshold, the fast detection process 112 detects a failure at 124. After the fast detection process 112 detects the failure at 124, the fast detection process 112 may notify at 126, or signal, the MKA process 114 of the failure at 124.

In response to the notification at 126, the MKA process 114 may perform an MKA peer termination process. The MKA peer termination process may terminate at 128 the MKA session, immediately terminating the MKA 114 process at 130. For example, the MKA process 114 at the first network element 102(1), in response to receiving the notification at 126 from the fast detection process 112, may terminate at 128 the MKA session with the second network element 102(2). Further, the MKA process 114 of the first network element 1021(1) may declare at 130 the MKA session with the second network element 102(2) terminated.

Using these techniques, the link security synchronization logic 110 may monitor the fast detection process 112 with the MKA process 114 to determine whether the secure communication link 108 is functioning with the security session associated with the secure communication link 108. Consequently, these techniques enable sub-second convergence of MKA sessions, rather than multi-second detection that resides in the MKA process 114. Additionally, there is no outdated or stale MKA key information. Because there is no outdated or stale MKA key information, the computer network 100 performs routing more efficiently and more securely. Moreover, by employing these techniques, network designers have the capability to leverage sub-second convergence while leveraging security on the communication link. Also, by synchronizing the MKA process 114 with the fast detection process 112, there is a close coupling between packet forwarding and re-routing around failures with security, thereby avoiding black hole routing where the packet forwarding and the associated secure session are not synchronized.

Turning to FIG. 2, shown is a flowchart depicting a method 200 for synchronizing communication links with their associated secure sessions, according to an example embodiment. The method 200 may be performed by, for example, the link security synchronization logic 110. After starting, the method 200 may proceed to operation 202. At operation 202, the link security synchronization logic may detect whether there is a carrier signal present at a network element. When the link security synchronization logic determines that a carrier signal is not present, the method 200 may proceed to operation 204. When the link security synchronization logic determines that a carrier signal is present, the method 200 may proceed to operation 210.

After determining that a carrier signal is not present, the link security synchronization logic, at operation 204, may determine that a physical link connecting the first network element to a second network element is unavailable. The method 200 may then proceed to operations 206 and 208 and return to operation 202.

Operations 206 and 208 may be performed in any order or they may be performed substantially simultaneously. At operation 206, an MKA process may be stopped or terminated. At operation 208, a fast detection process may be stopped or terminated.

In contrast, when the carrier signal is present, the link security synchronization logic, at operation 210, may determine that a physical link connecting the first network element to the second network element is available. The method 200 may then return to operation 202. The method also proceeds to operation 212 and/or operation 228.

At operation 212, the link security synchronization logic may initiate the fast detection process, which may be used to determine whether the first network element can communicate with the second network element over the communication link.

At operation 214, the fast detection process at the first network element may determine whether it has detected a peer, such as the second network element. The fast detection process may send status messages, such as keepalive messages, and wait for a response. If the fast detection process receives a response, the fast detection process may determine that it has detected a peer and the method 200 proceeds to operation 216 and returns to operation 214. However, if the fast detection process does not receive a response, then the fast detection process may determine that it has not detected a peer and the method 200 proceeds to operation 218.

At operation 216, the fast detection process may set a counter, here FD_Peer_Down, to zero. This counter may indicate a number of unresponded to status messages sent by the first network element. Because a peer was detected at operation 214, the counter is set to zero.

At operation 218, the fast detection process increments the FD_Peer_Down counter. The counter is incremented because a peer was not detected at operation 214.

At operation 220, the fast detection process may compare the FD_Peer_Down counter to a predetermined threshold. Here, the predetermined threshold is three. If the FD_Peer_Down counter is less than three, then an insufficient number of unresponded to status messages has been sent by the first network element and the method 200 returns to operation 214. However, if the FD_Peer_Down counter is at least three, then the first network element has sent a sufficient number of unresponded to status messages to determine that the second network element is unavailable. Accordingly, the method 200 may proceed to operations 222, 224, and 226.

Operations 222, 224, and 226 may be performed in any order or they may be performed substantially simultaneously. At operation 222, the fast detection process may determine that the second network element is unavailable. At operation 224, the fast detection process may notify a routing protocol that the second network element is unavailable. This may cause the routing protocol to determine a new communication link to replace the communication link to the second network element. Additionally, the first network element may remove the second network element from a routing table. At operation 226, the fast detection process may notify the MKA process that the second network element is unavailable, as described in more detail with reference to operation 238.

As described above, the method 200 may proceed to operation 228 from operation 210 when a physical link is detected. At operation 228, the link security synchronization logic may initiate the MKA process, which may be used to provide MACsec on the communication link between the first network element and the second network element. Further, the MKA process may be used to determine whether the first network element can communicate with the second network element over the communication link.

At operation 230, the MKA process may determine whether an MKA peer, such as the second network element, is detected. The MKA process may send MKA status messages, such as keepalive messages, and wait for a response. If the MKA process receives a response, the MKA process may determine that it has detected an MKA peer and the method 200 may proceed to operations 232 and 234 and return to operation 230. However, if the MKA process does not receive a response, then the MKA process may determine that it has not detected an MKA peer and the method 200 proceeds to operation 236.

Operations 232 and 234 may be performed in any order or they may be performed substantially simultaneously. At operation 232, the MKA process may set a counter, here MKA_Peer_Down, to zero. This counter may indicate a number of unresponded to MKA status messages sent by the first network element. Because a peer was detected at operation 230, the counter is set to zero.

At operation 234, the MKA process may establish an MKA security association between the first network element and the second network element, as appreciated by one of ordinary skill in the art.

At operation 236, the MKA process may increment the MKA_Peer_Down counter. The counter is incremented because an MKA peer was not detected at operation 230.

At operation 238, the MKA process may determine whether the MKA_Peer_Down counter is greater than a predetermined threshold, here three, or whether the MKA process has received a notification from the fast detection process that the peer is unavailable. If neither condition has been satisfied, then the method 200 returns to operation 230. Neither condition is satisfied when an insufficient number of fast detection process status messages and MKA status messages are unresponded to. However, if either condition is met, then the method 200 proceeds to operations 240, 242, and 244.

Operations 240, 242, and 244 may be performed in any order or they may be performed substantially simultaneously. At operation 240, the MKA process may determine that the second network element is unavailable. After operation 240, the method 200 may return to operation 230. At operation 242, the MKA process may notify a routing protocol that the second network is unavailable. This may cause the routing protocol to determine a new communication link to replace the communication link to the second network element. Additionally, the first network element may remove the second network element from a routing table. At operation 244, the MKA process may delete the MKA security association and the Security Association Key (SAK), as appreciated by one of ordinary skill in the art.

Figure 3:
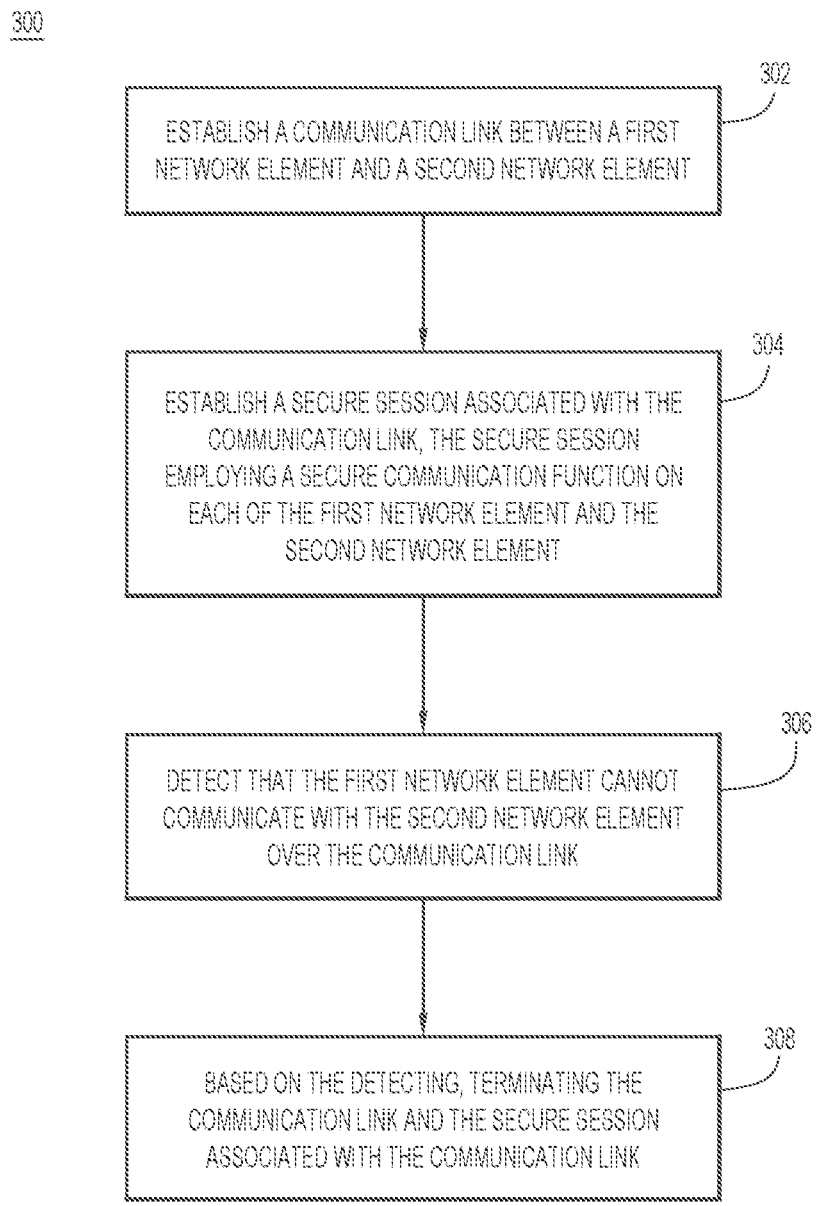
FIG. 3 is a flowchart depicting a method for synchronizing a secure session of the communication link with the communication link, according to an example embodiment.

Turning to FIG. 3, shown is a flowchart depicting a method 300 for synchronizing a secure session of the communication link and the communication link, according to an example embodiment. The method 300 may be performed by, for example, link security synchronization logic 110 at the first network element 102(1).

At operation 302, a communication link between the first network element and the second network element may be established.

At operation 304, the link security synchronization logic may establish a secure session associated with the communication link. The link secure synchronization logic on both the first network element and the second network element may establish the secure session. For example, the secure session may use MACsec and/or IPsec.

At operation 306, the link security synchronization logic may detect that the first network element cannot communicate with the second network element over the communication link. For example, keepalive packets may be sent to detect when the first network element and the second network element cannot communicate.

At operation 308, the link security synchronization logic may terminate both the communication link and the associated secure session, thereby synchronizing the secure session with the communication link.

Figure 4:
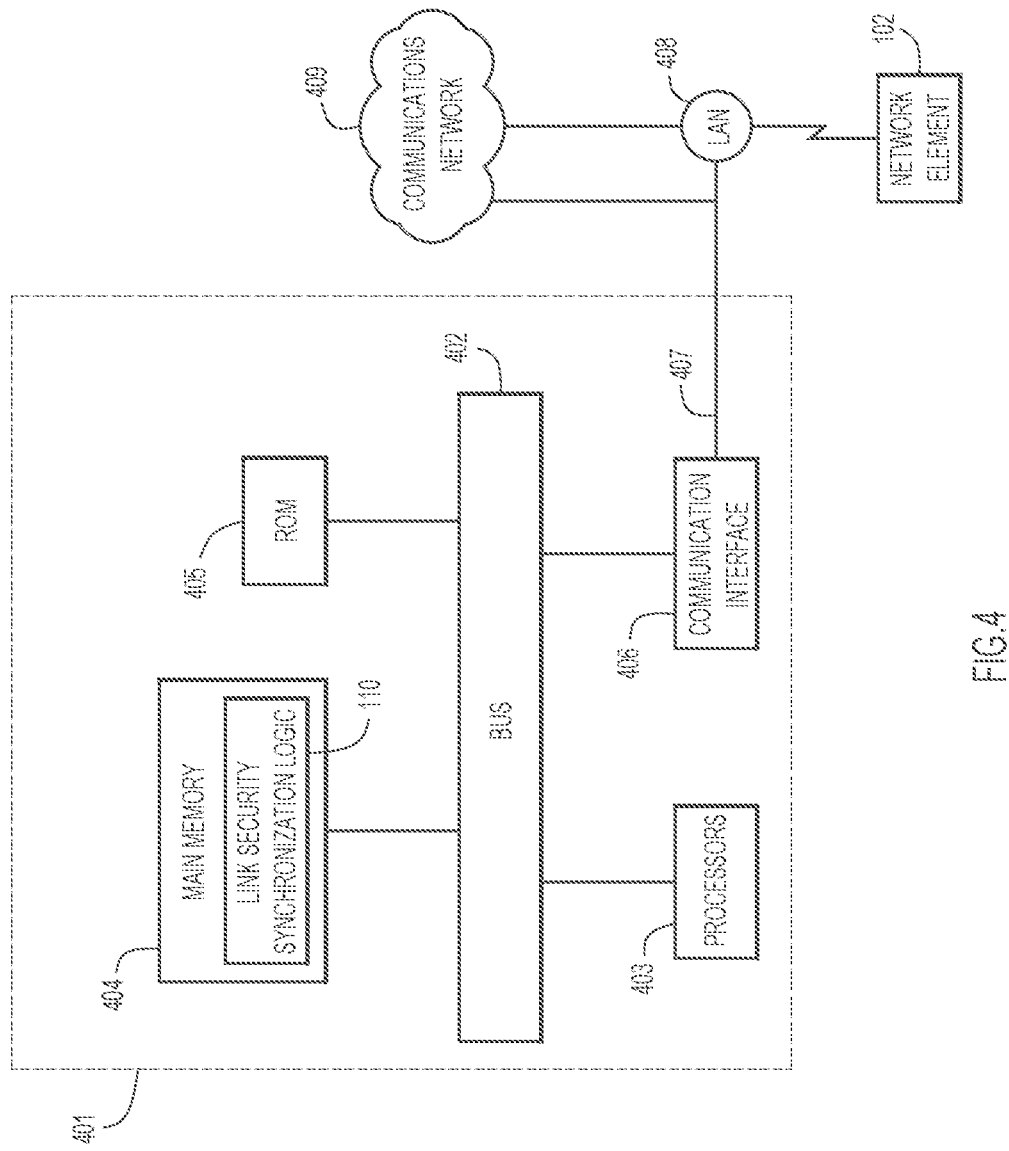
FIG. 4 is a block diagram showing a network element configured to perform the security session synchronizing techniques, according to an example embodiment.

FIG. 4 is a block diagram showing a network element, e.g., network element 102(1) shown in FIG. 1, configured to perform the security session synchronization techniques, according to an example embodiment. FIG. 4 illustrates a computer system 401 upon which the embodiments presented may be implemented. The computer system 401 includes a bus 402 or other communication mechanism for communicating information, and a processor 403 coupled with the bus 402 for processing the information. While the figure shows a single block 403 for a processor, it should be understood that the processors 403 represent a plurality of processing cores, each of which can perform separate processing. The computer system 401 also includes a main memory 404, such as a random access memory (RAM) or other dynamic storage device (e.g., dynamic RAM (DRAM), static RAM (SRAM), and synchronous DRAM (SD RAM)), coupled to the bus 402 for storing information and instructions to be executed by processor 403. In addition, the main memory 404 may be used for storing temporary variables or other intermediate information during the execution of instructions by the processor 403.

The computer system 401 further includes a read only memory (ROM) 405 or other static storage device (e.g., programmable ROM (PROM), erasable PROM (EPROM), and electrically erasable PROM (EEPROM)) coupled to the bus 402 for storing static information and instructions for the processor 1103.

The computer system 401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 401 performs a portion or all of the processing steps of the process in response to the processor 403 executing one or more sequences of one or more instructions contained in a memory, such as the main memory 404. One or more processors in a multi-processing arrangement may also be employed to execute the sequences of instructions contained in main memory 404. In alternative embodiments, hard-wired circuitry may be used in place of or in combination with software instructions. Thus, embodiments are not limited to any specific combination of hardware circuitry and software.

As stated above, the computer system 401 includes at least one computer readable medium or memory for holding instructions programmed according to the embodiments presented, for containing data structures, tables, records, or other data described herein. Examples of computer readable media are compact discs, hard disks, PROMs (EPROM, EEPROM, flash EPROM), DRAM, SRAM, SD RAM, or any other magnetic medium, compact discs (e.g., CD-ROM), or any other optical medium, or any other medium from which a computer can read.

Stored on any one or on a combination of non-transitory computer readable storage media, embodiments presented herein include software for controlling the computer system 401, for driving a device or devices for implementing the process, and for enabling the computer system 401 to interact with a human user. Such software may include, but is not limited to, device drivers, development tools, and applications software. Such computer readable storage media further includes a computer program product for performing all or a portion (if processing is distributed) of the processing presented herein.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 401 also includes a communication interface 406 coupled to the bus 402. The communication interface 406 provides a two-way data communication coupling to a network link 407 that is connected to, for example, a local area network (LAN) 408, or to another communications network 409 such as the Internet. For example, the communication interface 406 may be a wired or wireless network interface card to attach to any packet switched (wired or wireless) LAN. As another example, the communication interface 406 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 406 sends and receives electrical, electromagnetic or optical signals that carry digital data streams representing various types of information.

The network link 407 typically provides data communication through one or more networks to other data devices. For example, the network link 407 may provide a connection to another computer through a local area network 408 (e.g., a LAN) or through equipment operated by a service provider, which provides communication services through a communications network 409. The local network 408 and the communications network 409 use, for example, electrical, electromagnetic, or optical signals that carry digital data streams, and the associated physical layer (e.g., CAT 5 cable, coaxial cable, optical fiber, etc.). The signals through the various networks and the signals on the network link 407 and through the communication interface 406, which carry the digital data to and from the computer system 401 maybe implemented in baseband signals, or carrier wave based signals. The computer system 401 can transmit and receive data, including program code, through the network(s) 408 and 409, the network link 407 and the communication interface 406. Moreover, the network link 407 may provide a connection through a LAN 408 to another network element 102 such as a router, a switch, or a proxy.

In summary, the techniques presented herein involve a method that includes establishing a communication link between a first network element and a second network element. The method then establishes a secure session that is associated with the communication link. The secure session employs a secure communication function on each of the first network element and the second network element. The method further detects that the first network element cannot communicate with the second network element over the communication link. Based on detecting that the first network element cannot communicate with the second network element, the method terminates the communication link and the secure session associated with the communication link.

In another embodiment, the method notifies the secure communication function on the first network element that the first network element cannot communicate with the second network element.

In another aspect, the method also includes notifying a routing protocol function on the first network element to indicate that the first network element cannot communicate with the second network element.

In yet another embodiment, detecting that the first network element cannot communicate with the second network element includes incrementing a counter each time the first network element cannot communicate with the second network element. When the counter exceeds a predetermined threshold, the method determines that the first network element cannot communicate with the second network element.

In yet another aspect, the secure session is established using the Media Access Control security (MACsec) protocol or the Internet Protocol security (IPsec) protocol. When the secure session is established using MACsec, terminating the communication link and the associated secure session includes removing a MACsec Key Agreement (MKA) associated with the security session. It should be appreciated, however, that any key agreement protocol, such as IKE and TLS, may be used.

In another embodiment, terminating the communication link and the associated secure session includes removing the second network element from a routing table of the first network element.

In another embodiment, an apparatus including a communication interface configured to enable network communications and a processing device coupled with the communication interface may perform the synchronization techniques. The processing device may establish a communication link between a first network element and a second network element and establish a secure session associated with the communication link, the secure session employing a secure communication function on each of the first network element and the second network element. Additionally, the processing device detects that the first network element cannot communicate with the second network element over the communication link. When the processing device detects that the first network element cannot communicate with the second network element, the processing device terminates the communication link and the secure session associated with the communication link.

In yet another embodiment, one or more non-transitory computer readable storage media encoded with instructions that, when executed by a processor, perform the synchronization techniques. The instructions may cause the processor to establish a communication link between a first network element and a second network element and establish a secure session associated with the communication link, the secure session employing a secure communication function on each of the first network element and the second network element. Further, the processor also detects that the first network element cannot communicate with the second network element over the communication link. When the processor detects that the first network element cannot communicate with the second network element, the processor terminates the communication link and the secure session associated with the communication link.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    establishing a communication link between a first network element and a second network element;
    establishing a secure session associated with the communication link, the secure session employing a secure communication function on each of the first network element and the second network element, wherein the secure session utilizes a key agreement protocol, and wherein a first set of status messages are exchanged, by a key agreement process, between the first network element and the second network element via the secure session;
    detecting that the first network element cannot communicate with the second network element over the communication link by:
        establishing, using a fast detection process, a session independent of the secure session, wherein the session is established between the first network element and the second network element and wherein the fast detection process exchanges a second set of status messages between the first network element and the second network element via the session independent of the secure session, and
        synchronizing the key agreement process and the fast detection process to detect that the first network element cannot connect with the second network element by monitoring the fast detection process with the key agreement process; and
    terminating the communication link and the secure session associated with the communication link by the key agreement process based on the monitoring of the fast detection process by the key agreement process, and wherein terminating includes substantially simultaneously, when the key agreement process determines that the second network element is unavailable: deleting a Security Association Key (SAK) corresponding to the secure session, notifying a routing protocol function on the first network element to indicate that the first network element cannot communicate with the second network element, and removing the second network element from a routing table of the first network element.

2. The method of claim 1, further comprising:
    notifying the secure communication function on the first network element that the first network element cannot communicate with the second network element.

3. The method of claim 1, wherein the detecting further comprises:
    incrementing a counter each time the first network element cannot communicate with the second network element; and
    when the counter exceeds a predetermined threshold, determining that the first network element cannot communicate with the second network element.

4. The method of claim 1, wherein the secure session is established using a Media Access Control Security (MACsec) protocol or an Internet Protocol security (IPsec) protocol.

5. The method of claim 4, wherein when the secure session is established using MACsec, terminating further comprises:
    removing a MACsec Key Agreement (MKA) associated with the security session.

6. The method of claim 1, further comprising:
    in response to terminating the communication link, determining a new communication link between the first network element and the second network element.

7. The method of claim 1, wherein the fast detection process exchanges the second set of status messages between the first network element and the second network element by periodically sending status messages to the second network element at sub-second intervals.

8. An apparatus comprising:
a communication interface configured to enable network communications;
a processing device coupled with the communication interface, and configured to:
establish a communication link between a first network element and a second network element;
establish a secure session associated with the communication link, the secure session employing a secure communication function on each of the first network element and the second network element, wherein the secure session utilizes a key agreement protocol, and wherein a first set of status messages are exchanged, by a key agreement process, between the first network element and the second network element via the secure session;
detect that the first network element cannot communicate with the second network element over the communication link by:
establishing, using a fast detection process, a session independent of the secure session, wherein the session is established between the first network element and the second network element and wherein the fast detection process exchanges a second set of status messages between the first network element and the second network element via the session independent of the secure session, and
synchronizing the key agreement process and the fast detection process to detect that the first network element cannot connect with the second network element by monitoring the fast detection process with the key agreement process; and
terminate the communication link and the secure session associated with the communication link by the key agreement process based on the monitoring of the fast detection process by the key agreement process, and wherein terminating includes substantially simultaneously, when the key agreement process determines that the second network element is unavailable: deleting a Security Association Key (SAK) corresponding to the secure session, notifying a routing protocol function on the first network element to indicate that the first network element cannot communicate with the second network element, and removing the second network element from a routing table of the first network element.

9. The apparatus of claim 8, wherein the processing device is further configured to:
notify the secure communication function on the first network element that the first network element cannot communicate with the second network element.

10. The apparatus of claim 8, wherein the processing device is further configured to:
increment a counter associated with the routing protocol function on the first network element to indicate that the first network element cannot communicate with the second network element; and
when the counter exceeds a predetermined threshold, determine that the first network element cannot communicate with the second network element.

11. The apparatus of claim 8, wherein the secure session is established using a Media Access Control Security (MACsec) protocol or an Internet Protocol security (IPsec) protocol.

12. The apparatus of claim 11, wherein when the secure session is established using MACsec, the processing device is further configured to:
remove a MACsec Key Agreement (MKA) associated with the security session.

13. The apparatus of claim 8, wherein the processing device is further configured to:
in response to terminating the communication link, determine a new communication link between the first network element and the second network element.

14. The apparatus of claim 8, wherein the fast detection process exchanges the second set of status messages between the first network element and the second network element by periodically sending status messages to the second network element at sub-second intervals.

15. One or more non-transitory computer readable storage media encoded with instructions that, when executed by a processor, cause the processor to:
establish a communication link between a first network element and a second network element;
establish a secure session associated with the communication link, the secure session employing a secure communication function on each of the first network element and the second network element, wherein the secure session utilizes a key agreement protocol, and wherein a first set of status messages are exchanged, by a key agreement process, between the first network element and the second network element via the secure session;
detect that the first network element cannot communicate with the second network element over the communication link by:
establishing, using a fast detection process, a session independent of the secure session, wherein the session is established between the first network element and the second network element and wherein the fast detection process exchanges a second set of status messages between the first network element and the second network element via the session independent of the secure session, and
synchronizing the key agreement process and the fast detection process to detect that the first network element cannot connect with the second network element by monitoring the fast detection process with the key agreement process; and
terminate the communication link and the secure session associated with the communication link by the key agreement process based on the monitoring of the fast detection process by the key agreement process, and wherein terminating includes substantially simultaneously, when the key agreement process determines that the second network element is unavailable: deleting a Security Association Key (SAK) corresponding to the secure session, notifying a routing protocol function on the first network element to indicate that the first network element cannot communicate with the second network element, and removing the second network element from a routing table of the first network element.

16. The one or more non-transitory computer readable storage media of claim 15, wherein the instructions further cause the processor to:

notify the secure communication function on the first network element that the first network element cannot communicate with the second network element.

17. The one or more non-transitory computer readable storage media of claim 15, wherein the instructions further cause the processor to:
increment a counter associated with the routing protocol function on the first network element to indicate that the first network element cannot communicate with the second network element; and
when the counter exceeds a predetermined threshold, determine that the first network element cannot communicate with the second network element.

18. The one or more non-transitory computer readable storage media of claim 15, wherein the secure session is established using a Media Access Control Security (MACsec) protocol or an Internet Protocol security (IPsec) protocol.

19. The one or more non-transitory computer readable storage media of claim 18, wherein when the secure session is established using MACsec, the instructions further cause the processor to:
remove a MACsec Key Agreement (MKA) associated with the security session.

20. The one or more non-transitory computer readable storage media of claim 15, wherein the fast detection process exchanges the second set of status messages between the first network element and the second network element by periodically sending status messages to the second network element at sub-second intervals.

* * * * *